United States Patent
Holte et al.

(10) Patent No.: US 7,087,853 B2
(45) Date of Patent: Aug. 8, 2006

(54) METHOD FOR JOINING POROUS METAL STRUCTURES AND STRUCTURE FORMED THEREBY

(75) Inventors: Donald Owen Holte, Cincinnati, OH (US); Steven Childree Gay, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 312 days.

(21) Appl. No.: 10/647,986

(22) Filed: Aug. 26, 2003

(65) Prior Publication Data

US 2005/0045602 A1    Mar. 3, 2005

(51) Int. Cl.
    *B23K 9/167*    (2006.01)
(52) U.S. Cl. .............. 219/75; 219/121.46; 219/121.64; 219/137 WM
(58) Field of Classification Search ............... 219/75, 219/61, 137 R, 137 WM, 121.46, 121.64; 138/142
    See application file for complete search history.

(56) References Cited

U.S. PATENT DOCUMENTS

| | | | |
|---|---|---|---|
| 3,680,584 A * | 8/1972 | Pierart | ............... 138/142 |
| 3,707,617 A | 12/1972 | Rutter et al. | |
| 4,459,062 A | 7/1984 | Siebert | |
| 4,621,181 A | 11/1986 | Lachmitz | |
| 5,672,284 A | 9/1997 | Devanathan et al. | |
| 5,990,446 A * | 11/1999 | Zhang et al. | ............... 219/75 |

FOREIGN PATENT DOCUMENTS

| | | |
|---|---|---|
| EP | 0 454 861 | 11/1991 |
| EP | 0 589 585 | 3/1994 |
| EP | 0 852 984 | 7/1998 |
| WO | WO 99/21677 | 5/1999 |

OTHER PUBLICATIONS

"Welding Handbook, vol. 3, 8$^{th}$ edn." 1996, American Welding Society, Miami, FL 33126, XP002312251 p. 30-p. 41; figures 1.3, 1.6.

* cited by examiner

*Primary Examiner*—Clifford C. Shaw
(74) *Attorney, Agent, or Firm*—Peter D. Meyer; David K. Mattheis

(57) ABSTRACT

A method for joining weldable metal structures and compound structure formed using the method are disclosed herein. The method includes steps of abutting a first structure to a second structure along an edge to form a seam. The two structures are then welded together along the seam on one side of the structures through at least 75% of the thickness of the structures. The structures are then welded along a portion of the seam from the opposite side of the structures. The method may be used to join porous weldable metal structures. The method may be used to create a compound structure having very narrow weld seam widths.

9 Claims, 2 Drawing Sheets

METHOD FOR JOINING POROUS METAL STRUCTURES AND STRUCTURE FORMED THEREBY

FIELD OF THE INVENTION

The present invention relates to method for joining porous weldable metal structures. In particular, the invention relates to methods for joining laminated porous weldable metal structures.

BACKGROUND OF THE INVENTION

Porous weldable metal structures are well known in the art. These structures may be formed by sintering metal particles or by laminating porous metal sheet material into a composite laminate. The structures may be joined one to another by welding processes. The size and shape of the porous metal structure may be limited by the method of manufacturing chosen. Joining discrete porous structures can be problematic because the structures are porous rather than uniform in density. The lack of uniform density in the structure together with the uniform application of welding energy can create a weld seam that is not uniform in weld penetration and/or weld seam width.

For applications requiring high uniformity in the permeability of the finished structure non-uniform weld seams can create performance issues in the finished product because of local variations in the permeability of the structure in and around the weld seams, and because of surface irregularities at the seam.

It is desired to provide a method for joining porous metal structures having a uniformly narrow weld seam that is generally free of surface irregularities.

SUMMARY OF THE INVENTION

Porous weldable metal members may be joined by the use of the method disclosed herein. The finished structures may have narrow weld seams and high permeability around the weld seams. A first porous weldable metal structure is placed edge to edge with a second weldable metal structure of similar thickness to form a seam. The combined metal structures are welded from one side through at least about 75% of the thickness of the structures. The structures are then welded from the other side to fuse the seam along that side of the structures.

In one embodiment, a porous structure having a gradient of porosity from one surface to the opposing surface may be joined to another weldable structure. The porous structure may be described as having a coarse porosity surface and an opposing fine porosity surface. The structures may be gas tungsten arc welded along the seam 300 of the coarse porosity side of the porous structure. The structures may then be plasma arc welded along the seam on the fine porosity side of the porous structure.

In another embodiment, the structures may be laser welded along the seam on the fine side of the porous structure, and gas tungsten arc welded on the coarse side of the structures.

All references cited in the following description of the invention are hereby incorporated herein by reference.

DETAILED DESCRIPTION OF THE INVENTION

Figure 1:
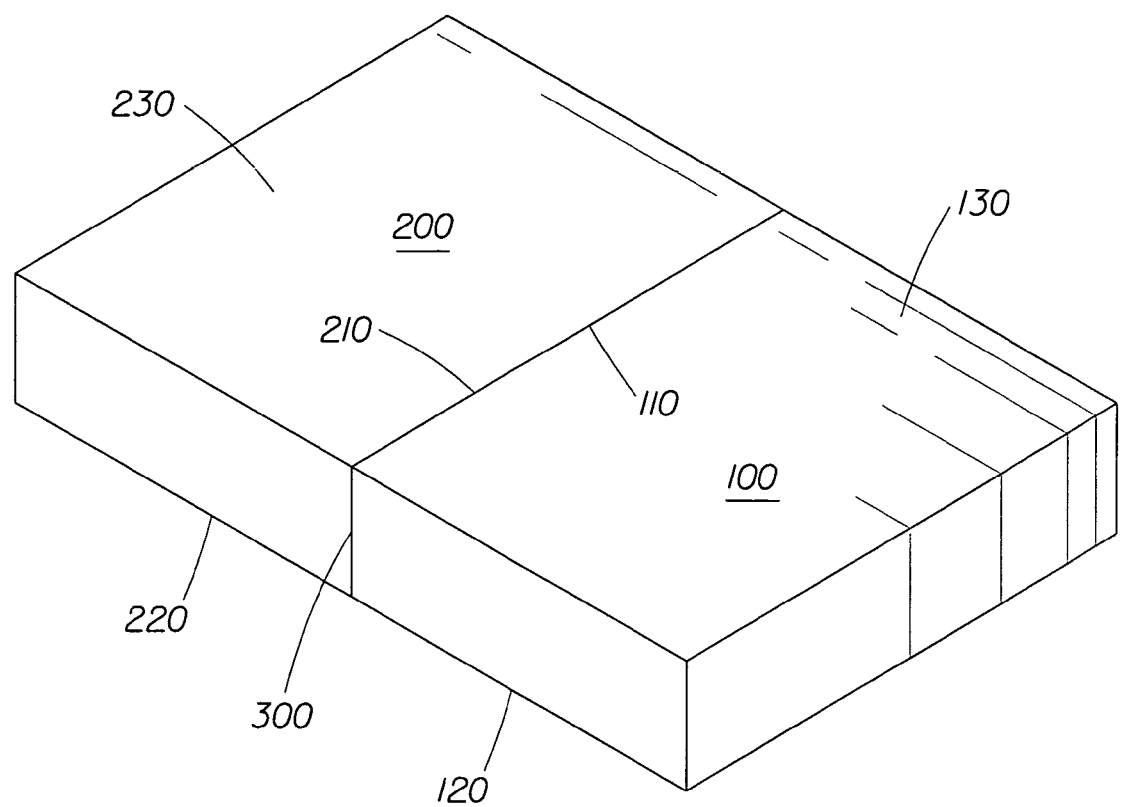
FIG. 1 is a schematic isometric view of two weldable metal structures joined according to one embodiment of the present invention.
Figure 2:
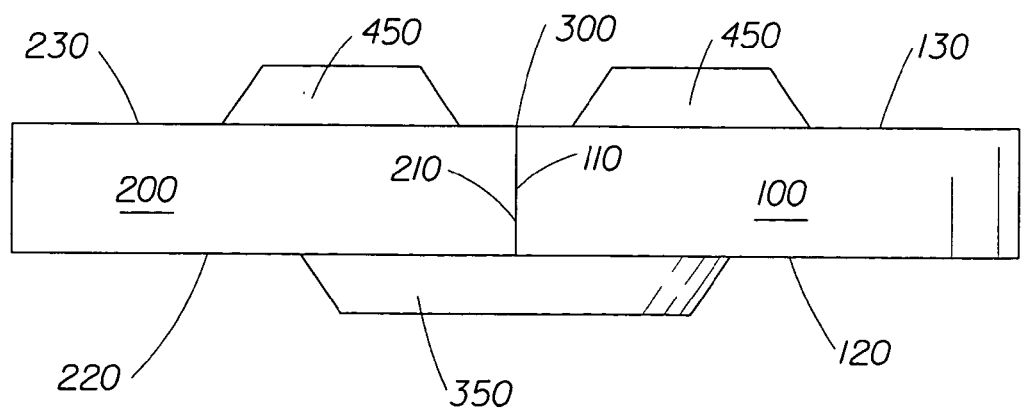
FIG. 2 is a schematic cross sectional view of an apparatus that may be used in the practice of an embodiment of the invention.
Figure 3:
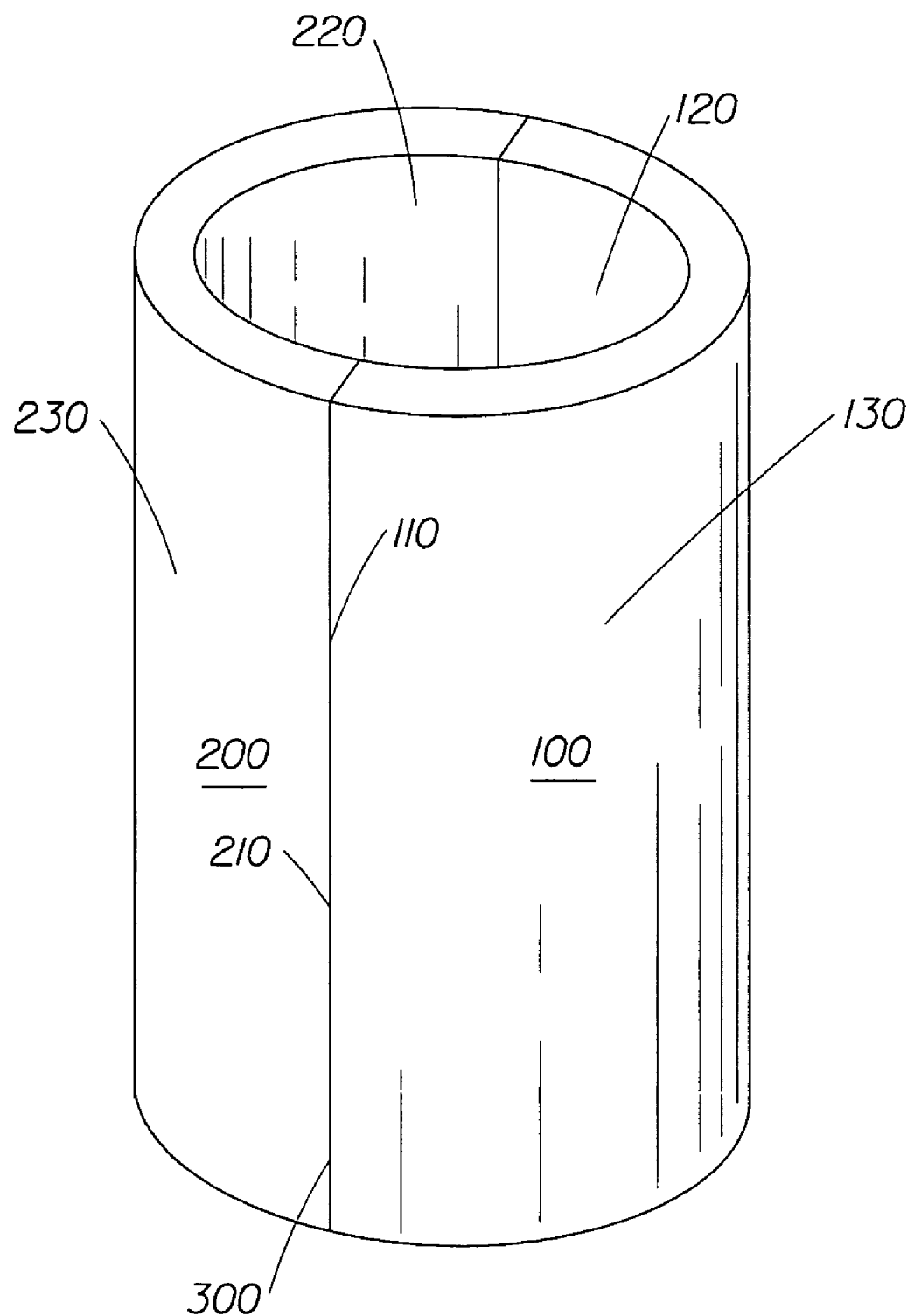

According to FIG. 1, an edge 110 of a first porous weldable metal structure 100 is abutted to an edge 210 of a second weldable metal structure 200 forming a seam 300. The first porous weldable metal structure may be a sintered structure or a structure formed by laminating discrete porous weldable metal sheets into a single structure. The porous structure 100 may have a uniform porosity throughout the thickness of the structure. Alternatively, the porous structure 100 may have a gradient of porosity across the thickness of the structure. The structure with a gradient of porosity has a low porosity, or fine surface, and a high porosity, or coarse surface opposed to the fine surface. An exemplary laminated porous structure is described in commonly assigned U.S. Pat. No. 6,473,990 issued Nov. 5, 2002 to Trokhan, et al. The second weldable metal structure 200 may be a porous metal structure similar to the first weldable metal structure 100. Alternatively, the second weldable metal structure 200 may be a non-porous metal structure. The second weldable metal structure 200 has a thickness about equal to the thickness of the first weldable metal structure 100.

The first weldable metal structure 100 and the second weldable metal structure 200 are welded along at least a portion of the seam 300 from the coarse side of the porous structure 100. The structures are welded through at least about 75% of the thickness of the structures. Welding the structures through the entire thickness may disrupt the porosity and permeability of the structures and may produce a non-uniform weld seam. The structures may be welded along the entire seam 300 or along only a portion of the seam 300. The first weldable metal structure 100 and second weldable metal structure 200 may be welded along the seam 300 on the coarse porosity side of the first structure 100 by gas tungsten arc welding as is known in the art.

In an embodiment where the first weldable metal structure and second weldable metal structure are gas tungsten arc welded as described above, filler wire may be added to the weld pool as an optional step. An exemplary filler wire is AWS ER316L with a diameter of 0.025 in (0.63 mm) available from Airgas, 1007 Monitor St., La Crosse, Wis.

The combined metal structures may be joined along the seam 300 on the fine porosity side of the first structure 100 by plasma arc welding as is known in the art. The combined structures may be joined along a portion of the seam 300 or alternatively, along substantially the entire seam 300. The structures are joined through at least about 5% of the thickness of the structures by plasma arc welding.

In an alternative embodiment, the structures may be joined along at least a portion of the seam 300 on the fine porosity surface by laser beam welding as is known in the art. In this embodiment, the structures are joined through at least about 5% of the thickness of the structures. The structures may be joined along substantially the entire length of the seam 300 by laser beam welding or along only a portion of the seam 300.

In any of the above described embodiments, partially joined structures may be farther joined by the use of an adhesive system. An epoxy resin system is an exemplary adhesive joining system.

As an optional step, thermal conductive elements, or heat sinks, may be used to physically stabilize the metal structures during the welding steps and also to remove thermal energy from the structures as a means of at least partially controlling the dimensions of the welded seam. Heat sinks may be disposed in contact with the surfaces where the welding is to be performed during a step of the process. These heat sinks may be disposed adjacent to, but spaced apart from the seam 300. A single heat sink, or plurality of heat sinks, may be disposed along the seam 300 in contact with the seam 300 on the surfaces of the structures opposed to the surfaces where a welding step is to be performed. Without being bound by theory, applicants believe these additional heat sinks contribute to limiting the width of the welded seam.

After a first welding step has been completed along the seam 300 on one side of the structures, the structures may be inverted, or the heat sinks may be repositioned such that heat sinks are again adjacent to, but spaced apart from, the seam 300 to be welded and also along and in contact with the seam 300 of the opposite surfaces of the structures.

Mechanical systems including springs, cams, and levers as well as pneumatic or hydraulic systems may be used to apply force to the structures through pressure applied by the heat sinks to stabilize the structures during the welding processes.

By utilizing the method of the invention, large compound structures comprising multiple porous elements may be fabricated. These structures may have simple shapes or elaborate shapes requiring extensive clamping fixtures for the fabrication. As an example, but without limiting the invention, the methods may be used to form a cylindrical structure having a porous circumferential surface and/or porous end surfaces.

In one embodiment, the methods of the invention may be used to produce compound structures having fine surface weld seam widths of less than about 0.090 inches (2.29 mm). In another embodiment, the methods may be used to join porous metal structures yielding weld seams having a fine surface width of less than about 0.075 inches (1.90 mm). In another embodiment, the methods may be used to join porous metal structures yielding weld seams having a fine surface width of less than about 0.050 inches (1.27 mm).

The following non-limiting examples illustrate the application of the method of the invention. Each of the Examples describes the joining of two coupons of laminated porous weldable metal. The coupons comprise six layers laminated together. Table 1 provides more detailed information regarding the six layers of the coupons.

TABLE I

| Ply | Warps/Shutes per 2.54 cm for plies 1–5 Perf Plate/Hole Size/Pitch for Ply 6 | Warp/Shute diameter (mm) for plies 1–5 Perf Plate Thickness for Ply 6 | Weave |
|---|---|---|---|
| 1 | 165 × 1400 | 0.071/0.041 | Dutch Twill |
| 2 | 150 × 150 | 0.066 | Square |
| 3 | 60 × 60 | 0.191 | Square |
| 4 | 30 × 30 | 0.406 | Square |
| 5 | 16 × 16 | 0.711 | Square |
| 6 | 1.65 mm diameter holes on a 2.77 mm pitch | 24 gauge ss | None |

EXAMPLE 1

Two coupons of laminated weldable metal according to Table 1, were abutted to each other along an edge to form a seam. The coupons were clamped with metal bars to a worktable. The coarse surfaces of the coupons were gas tungsten arc welded along the seam. A 3/32 inch (2.4 mm) 2% thoriated tungsten electrode was used. The coupons were welded at 7.1 Volts at 4 inches per minute with an argon gas shield. 0.025 inch AWS ER316L filler wire was added at 45 inches per minute. Pulse was set "on", with peak pulse time of 0.075 seconds, background pulse time: 0.055 seconds, frequency: 7.69 pulses per second, average amps: 60.9 A, peak amps: 80.0 A, and background pulse amps: 35.0 A.

The gas tungsten welded coupons were inverted, and again clamped to the worktable and plasma arc welded with an Ultima 150 power supply and a model 3A welding torch. The plasma welding was perfumed at 3.5 inches per minute and 20 amps with 10 $ft^3$/hour or argon torch gas a 0.031 inch plasma tip with a #0 tip setback setting and a plasma gas flow rate of 0.5 $ft^3$/hour. The finished weld seam had a width ranging from 0.140 to 0.160 inches (3.56 to 4.06 mm) on the coarse porosity surface and ranging from 0.050 to 0.080 inches (1.27 to 2.03 mm) on the fine porosity surface.

EXAMPLE 2

Two coupons, similar to the coupons of Example 1, were gas tungsten arc welded as described in Example 1. The welded coupons were then inverted and laser beam welded along the seam on the fine porosity surfaces of the coupons. A $CO_2$ laser set at 200 Watts, having a 7.5 inch focal length, a depth of focus of 0.25 inches, a focus spot size of 0.05 inches, and a travel speed of 10 inches per minute was used with 1–2 psi of argon assist gas. The finished weld seam had a width ranging from 0.140 to 0.160 inches (3.56 to 4.06 mm) on the coarse porosity surface and ranging from 0.024 to 0.040 inches (0.61 to 1.02 mm) on the fine porosity surface.

While particular embodiments of the present invention have been illustrated and described, it would be obvious to those skilled in the art that various other changes and modifications can be made without departing from the spirit and scope of the invention it is therefore intended to cover in the appended claims all such changes and modifications that are within the scope of the invention.

What is claimed is:

1. A method for joining a first porous laminated weldable metal structure to a second porous laminated weldable metal structure, each structure comprising a coarse surface, a fine surface opposed to the coarse surface, a thickness, and an edge, wherein the thickness of the first structure is about the same as the thickness of the second structure, the method comprising steps of:
    a) abutting the edge of the first structure with the edge of the second structure wherein the abutted edges constitute a seam, wherein the coarse surface of the first structure is disposed adjacent to the coarse surface of the second structure,
    b) gas tungsten arc welding the first structure and second structure from the coarse surfaces along a portion of the seam through at least about 75 percent of the thickness,
    c) plasma arc welding the first structure and the second structure along a portion of the seam from the fine surfaces.

2. The method according to claim 1 further comprising a step of juxtaposing a heat sink with the second surfaces of the structures in contact with the seam.

3. The method according to claim 1 further comprising a step of disposing a first heat sink with the first surface of the first weldable metal structure along the seam, and disposing a second heat sink with the first surface of the second structure along the seam, wherein the first thermal conduction member and second thermal conduction member are adjacent to but not in contact with the seam.

4. The method according to claim 1 further comprising a step of adding filler wire to the seam, as the structures are gas tungsten arc welded.

5. A method of joining a first porous laminated weldable metal structure and a second porous laminated weldable metal structure, each metal structure comprising a coarse surface, a fine surface opposed to the coarse surface, a thickness, and an edge, the method comprising steps of:
 a) abutting the edges of the first porous laminated weldable metal structure and the second porous laminated weldable metal structure wherein the abutted edges constitute a seam, and wherein the coarse surface of the first porous laminated weldable metal structure is disposed adjacent to the coarse surface of the second porous laminated weldable metal structure,
 b) gas tungsten arc welding the first structure and second structure from the coarse surfaces, along the seam, through at least about 75 percent of the thickness,
 c) laser welding the first structure and the second structure along the seam on the fine surfaces.

6. The method according to claim 5 further comprising a step of juxtaposing a heat sink with the fine surfaces of the structures along the seam as the porous metal structures are gas tungsten arc welded.

7. The method according to claim 5 further comprising a step of adding filler wire to the seam, as the structures are gas tungsten arc welded.

8. A porous metal structure comprising:
 a plurality of porous, laminated weldable metal elements joined together,
 wherein the metal elements are joined with at least one weld seam having a width of less than about 0.075 inches.

9. The porous metal structure of claim 8 wherein the structure comprises a cylinder.

\* \* \* \* \*